Figure 1:
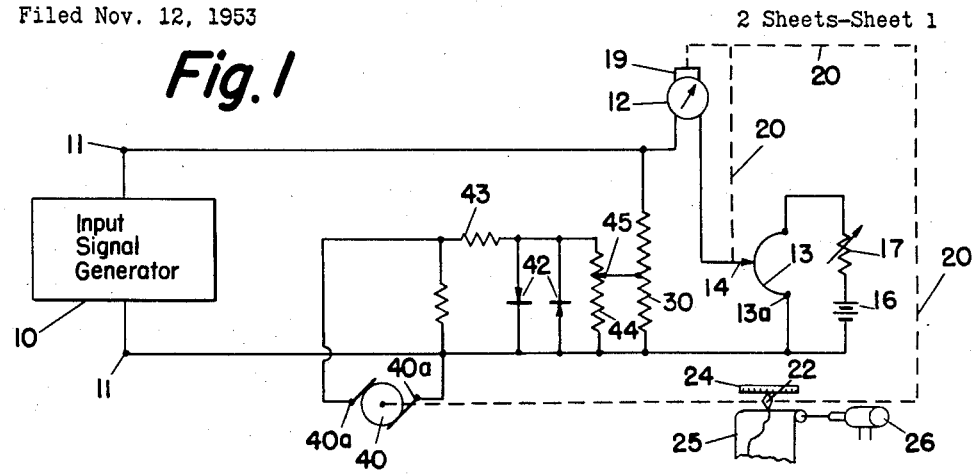

Nov. 17, 1959 W. R. CLARK 2,913,654
HIGH-SPEED SELF-BALANCING SERVOSYSTEM
Filed Nov. 12, 1953 2 Sheets-Sheet 1

United States Patent Office 2,913,654
Patented Nov. 17, 1959

2,913,654

HIGH-SPEED SELF-BALANCING SERVOSYSTEM

William Russell Clark, Jenkintown, Pa., assignor to Leeds and Northrup Company, Philadelphia, Pa., a corporation of Pennsylvania Application November 12, 1953, Serial No. 391,491

16 Claims. (Cl. 318—448)

This invention relates generally to high-speed self-balancing systems responsive to the magnitude of a quantity or signal in the presence of noise but with the substantial elimination of noise from the output without reduction in the speed of response. This invention is particularly applicable to high-speed self-balancing recorders or controllers to remove from the record or control action the effects of noise without reduction in the speed of response, and has for an object the provision of apparatus for controlling the speed of response of a a self-balancing system so that the speed of rebalancing will be high for large unbalances and low for small unbalances.

For the purposes of the subject description, noise may be defined as disturbances or variations of the indicating means which occur as a result of spurious signals not related to the magnitude of the condition that is desired to be measured. In general, such noise is composed of random frequency, low-magnitude disturbances. The noise may be due solely to disturbances or variations superimposed on the input quantity or may additionally include disturbances introduced by the error-detecting system.

The problem of making precise measurements in the presence of noise is one which is present, at least to some degree, in practically all recorder applications. For applications where the measured quantity is substantially steady or only varies slowly, the usual solution has been to average or filter out the noise by slowing down the measuring device. As a result, the instrument will not respond quickly to changes in the measured quantity. However, this fact is ordinarily of minor importance where speed is not of the essence. In recorder applications where noise is superimposed on a constantly changing signal, in order to follow this signal accurately the recorder must respond as quickly as possible. Under such circumstances, any method of suppressing noise which would slow down the operation of the recorder would therefore produce an objectionable error in measurement.

This invention is applicable to any recorder or controller application where noise is superimposed on a rapidly changing signal, and is particularly applicable to systems utilized in spectrochemical analyses of various compositions where a radiation-responsive device has an output corresponding with the intensity of a selected line or lines of a spectrum produced from the composition. As more fully explained in Machler Patent No. 2,541,877, the spectrum will be produced either by a spark discharge or by an arc discharge depending upon the character of the composition or alloy upon which the analysis is to be made. With each discharge the intensity of the line to be measured is compared to the intensity of a standard line which may be the intensity of a selected known line of the spectrum or it may be the intensity of "overall light" as disclosed in United States Patent No. 2,734,418, granted February 14, 1956 upon the copending application of Enns, Serial No. 156,763, filed April 19, 1950. In scanning a spectrum, such for example with a direct reading spectrochemical analyzer as disclosed in United States Patent No. 2,757,568, issued August 7, 1956, and United States Patent No. 2,735,330, issued February 21, 1956 and respectively granted upon copending applications of Fastie, Serial No. 241,194, filed August 10, 1951 and Polster, Serial No. 241,172, filed August 10, 1951, it is desirable that the recorder, which may be of the ratio measuring type disclosed in Williams Letters Patent No. 2,522,976, reach its peak reading as quickly as possible. However once the recorder is at its peak reading, it is desirable to reduce small fluctuations in readings around that point. Reduction of these fluctuations to a point where they are substantially eliminated results in a more precise measurement and provides for clarity and ease of reading of the recorder record as well as preventing excessive wear on the pen and paper which in some cases leads to clogging of the pen and tearing of the paper, thus destroying the usefulness of the record.

In accordance with the present invention, provision has been made for utilizing the relatively large difference in amplitude between the measured quantity or signal and the noise to obtain the desired noise suppression without appreciably reducing the speed of balancing. Thus, the recorder is permitted to come to balance rapidly for large signals while retaining the filtering action of slow recorders for small fluctuating signals, i.e., noise.

More specifically and in accordance with one aspect of the invention, there is provided a high-speed self-balancing measuring system for recording the magnitude of a quantity or signal in the presence of noise but with the substantial elimination of this noise from the record without reduction in the speed of response. This system comprises a source of a first electrical signal to be measured including a component of noise and a source of an adjustable electrical signal connected in series-circuit with the source of first electrical signal. A signal unbalance detector is connected in the series-circuit, and there is provided means responsive to the detector for adjusting the magnitude of the adjustable electrical signal to maintain said electrical signals equal in magnitude. The system further includes an electrical generator operated with adjustment of the responsive means, recorder means operable in accordance with the responsive means and a voltage divider connected across the output of the generator. The voltage divider has the characteristic that the ratio of its input to output voltage increases with increased input voltage. The output voltage from the voltage divider is applied in circuit with the detector to provide a damping signal for the responsive means which is less than the output of the generator and the ratio of the damping signal to the output voltage of the generator increases as the condition of balance is approached.

Further in accordance with the invention, the voltage divider includes a linear impedance and a non-linear impedance. In one form of the invention the non-linear impedance has the characteristic of decreased resistance with increased voltage and the output voltage from the voltage divider is taken from across the non-linear impedance to provide a damping signal for the responsive means which varies as a power less than the first power of the speed of operation of the responsive means, whereby the component of noise in the first electrical signal is substantially without effect upon the adjustable electrical signal.

Figure 2:
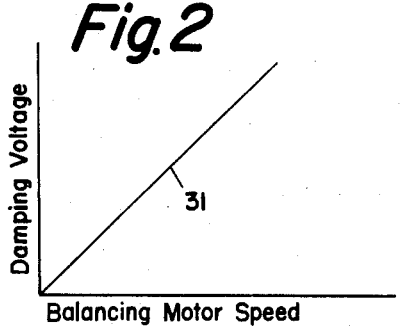
Figure 3:
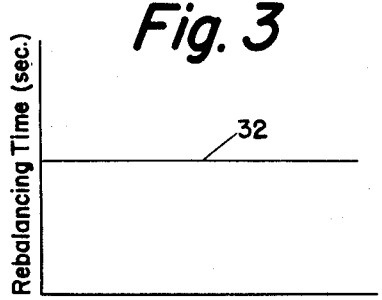
Figure 3A:
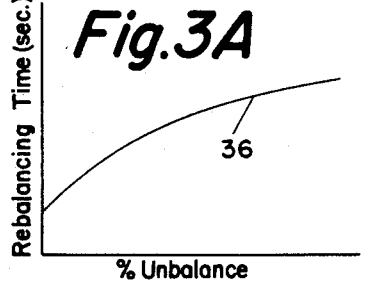
Figure 2B:
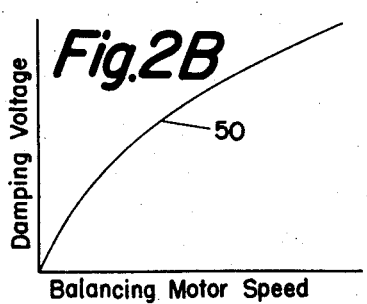
Figure 3B:
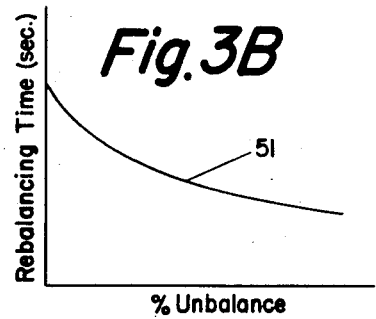
Figure 4:
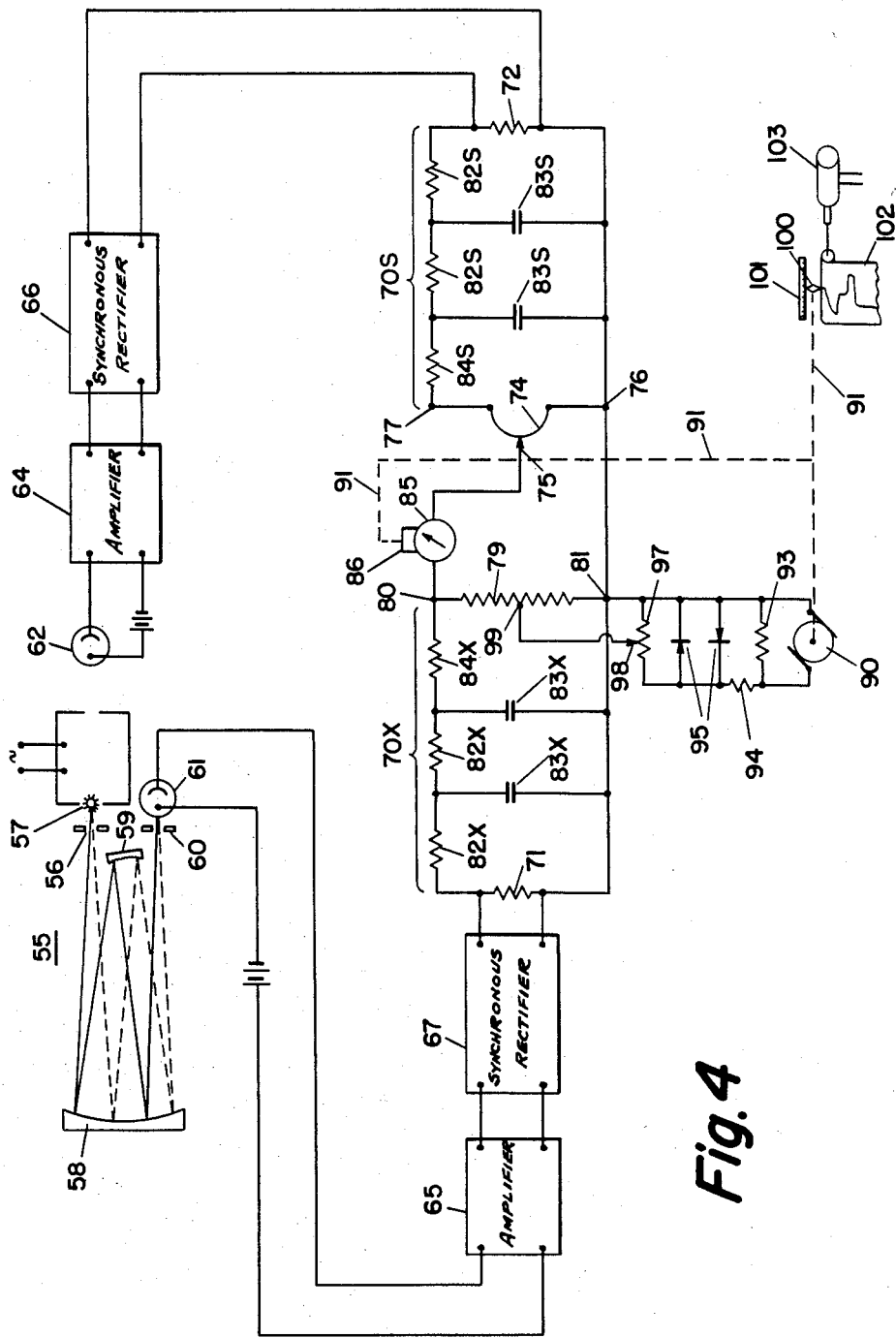

For a more detailed disclosure of the invention and for further objects and advantages thereof, reference is to be had to the following description taken in conjunction with the accompanying drawings, in which:

Fig. 1 schematically illustrates the basic measuring circuit of a recorder embodying the present invention;

Figs. 2–2B and Figs. 3–3B are curves useful in explaining the present invention; and Fig. 4 diagrammatically illustrates a modification of the present invention as applied to a system for spectrochemical analysis.

Referring to Fig. 1, there is diagrammatically shown a null type high-speed recorder system embodying the present invention. Such system is particularly applicable to the measurement of any source where the noise is appreciable with respect to the signal being measured. The condition under measurement operates on a primary measuring element, forming part of an input signal generator 10, to produce at the terminals 11 an input voltage proportional to the magnitude of the condition being measured. The input signal generator 10 and terminals 11 form part of a self-balancing potentiometer system for measuring the magnitude of the condition, such system further including a null detector device 12 connected in series with the terminals 11 across that portion of the slidewire 13 between terminal 13a and a relatively adjustable contact 14. The slidewire current, furnished by any suitable source for example a battery 16, is adjusted to a predetermined value for which the slidewire is calibrated as by a variable resistance 17; the standard cell and associated switch commonly used in setting of the slidewire current to the standard value are not shown.

When the magnitude of the condition under measurement remains constant, no current flows through the detector device 12 because of balance of the input voltage applied to terminals 11 and the voltage drop between the terminal 13a of slidewire 13 and contact 14. As long as the balance condition exists, the driving means or balancing motor 19 associated with detector device 12 is at rest. Upon occurrence of a change in the magnitude of the condition, the aforementioned voltages become unbalanced and the detector device 12 causes the balancing motor 19 to operate in one direction or the other. In accordance with such operation, a driving means or balancing motor 19 associated with detector device 12 and operated from an amplifier included therewith effects adjustment of contact 14 relative to slidewire 13 in proper sense to restore balance of the potentiometer network. This balancing continues until the voltage produced at input terminals 11 is again balanced by the voltage drop between the contact 14 and the terminal 13a of the slidewire. When these voltages are again in balance there is no further operation of balancing motor 19 by detector device 12 and thus, no further adjustment of the contact 14. It will be understood that for every different magnitude of the condition under measurement there is a single definite position of mechanical connection 20, which may include reduction gearing, and all parts directly associated therewith including the stylus or pen 22 and the slidewire contact 14. The pen 22 may include a pointer or indicator associated with a scale 24. The pen 22 is adapted to mark a recorder chart 25 which may be driven from any suitable device such, for example, as a motor 26 to provide a continuous record of the magnitudes of the condition under measurement.

With the system as thus far described, the pen or stylus 22 will be moved to its final position within a very short time but because of inertia there will be a tendency for the recorder to overshoot. In order to eliminate overshooting, the prior art practice has been to apply a reverse torque to balancing motor 19 to reduce the speed of the balancing motor as the balancing point is approached. This has been accomplished by introducing into the potentiometer network a linear damping voltage that is proportional to speed. One prior art method of providing linear damping has been the utilization of a D.C. tachometer as disclosed in U.S. Patent No. 2,113,164 to A. J. Williams, Jr. Another prior art method of providing linear damping has been by the utilization of a filtering network including several stages of resistance-capacitance filtering.

With linear damping as above described, the curve 31 of damping voltage plotted against balancing motor speed is a straight line as shown in Fig. 2. As the damping voltage is linear, the time required for rebalancing is the same regardless of the degree of unbalance. Thus, as shown by the curve 32 in Fig. 3, whether the unbalance be of the order of full scale, half scale, quarter scale, or less, the rebalancing time will remain constant.

Figure 2A:
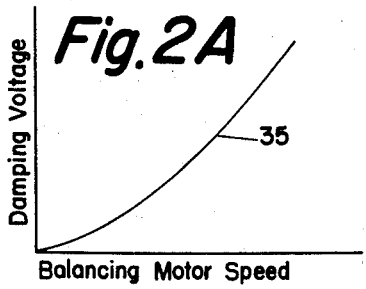

With linear damping the recorder balancing curve is substantially that of an exponential and while overshooting has been eliminated, nevertheless the rebalancing time is somewhat greater than desirable for some magnitudes of unbalance. In order to reduce the rebalancing time for these unbalances it was proposed by A. J. Williams, Jr. in Patent No. 2,113,436, to balance the system by throwing on full accelerating torque and leaving it on up to a time just before the system is balanced and then to reverse the torque at an optimum time so that the system comes rapidly to rest at the balance point regardless of the original unbalance condition. This operation was provided by using a tachometer and an associated voltage divider with a voltage output proportional to the square of the speed. Curve 35 in Fig. 2A shows a voltage characteristic with the damping voltage proportional to a power higher than the first power of the speed of the balancing motor with damping voltage plotted as the ordinate and balancing motor speed as the abscissa.

As shown in Fig. 3A by curve 36, this type of non-linear damping reduces the total rebalancing time required with reduced unbalance and particularly near the balance point.

Upon approach of the balance point to within a region of 1% or less of maximum unbalance, the effect of noise reaches its maximum since at that point the unbalance voltage and noise voltage are of comparable magnitude. From curve 36 it will be seen that with a system as disclosed in said Williams Patent No. 2,113,436, the noise will be followed by the recorder at least as fast as the signal since the response time decreases as the recorder nears the balance point.

While the non-linear damping disclosed in Patent No. 2,113,436 provides for a faster speed of response of the measuring system than can be obtained with linear damping, in obtaining the higher speed the response of the system to noise has been increased. Thus, when the system is utilized for recording the magnitude of a quantity in applications where noise is present and the signal is constantly changing, this system has left something to be desired.

Accordingly, it is the object of the present invention to provide a recorder having a high speed of response to large signals with a reduction of the noise effects in the record near the balance point. Heretofore noise reduction and fast recorder response to large unbalances have been incompatible; one result could be obtained only at a sacrifice of the other.

In accordance with the present invention there is provided a D.C. tachometer generator 40 driven from the shaft of the balancing motor 19 by way of mechanical connection 20. The tachometer generator 40 produces at its terminals 40a a D.C. voltage proportional to its speed and of a polarity dependent upon its direction of rotation. By utilizing a non-linear circuit including a non-linear impedance 42 in the tachometer output and by introducing the output voltage from the non-linear circuit into the detector input circuit of the recorder in opposition to the change in input signal, there will be obtained the aforementioned recorder speed characteristic which allows the recorder to come to balance rapidly for large signals while retaining the filtering action of slow recorders for the small fluctuating signals called noise.

More particularly and as shown in Fig. 1, there is connected across the output of tachometer generator 40 a voltage divider including in one arm thereof a linear impedance or resistance 43 and in another arm thereof the non-linear impedance 42. The damping voltage is taken from this divider by way of a resistor 44 and a variable tap 45 and applied to a portion of resistor 30, the entire resistor 30 being in series in the balancing network with detector 12 and the variable portion of slidewire 13. For large values of recorder input signal the balancing motor 19 runs at maximum speed producing maximum tachometer output. Because of the large tachometer voltage appearing at terminals 40a of tachometer 40, the current through the non-linear impedance 42 is large, lowering its resistance and minimizing the divider ratio. The resulting voltage across the non-linear impedance 42 is, therefore, small in comparison to the recorder error voltage, the latter being the input voltage minus the voltage between terminal 13a and slidewire contact 14. Accordingly, the net input voltage to the balancing amplifier of the detector device 12 is therefore large, giving the recorder a very fast speed of response.

For small changes in the input signal applied to terminals 11, the balancing motor 19 runs at less than full speed, resulting in a corresponding reduction in the voltage output from tachometer 40.

Under these conditions the resistance of the non-linear impedance 42 is considerably increased so that the output from the voltage divider is substantially equal and of opposite sign to the error voltage which is the difference between the input voltage and the slidewire voltage between contact 14 and terminal 13a. Accordingly, the net input to the balancing amplifier or detector device 12 is relatively small, giving the recorder a very slow response.

In one embodiment of the invention, the non-linear impedance 42 comprised a parallel combination of an oppositely poled pair of copper-copper oxide rectifiers having the characteristic that the resistance of the combination is much higher at lower voltages than at higher voltages. As a result, small tachometer voltages are proportionally less attenuated by the network including non-linear means 42 and linear impedance 43 than higher tachometer voltages. With the system as shown in Fig. 1 the damping voltages when plotted against balancing motor speed will have a curve similar to curve 50 shown in Fig. 2B.

Any combination of linear elements with non-linear elements may be employed in the voltage divider connected across the tachometer generator 40 provided the output from the voltage divider has the characteristic of curve 50. For example, the non-linear element 42 may comprise an untreated carbon filament lamp having a generally similar current-resistance characteristic to a copper-copper oxide rectifier. In the event the non-linear element has the reverse characteristic such as found in a tungsten or other metallic filament lamp it may be inserted in the circuit as element 43 and element 42 would then comprise a linear resistor.

When plotting rebalancing time with respect to percent unbalance the system of Fig. 1 will have a characteristic similar to curve 51 shown in Fig. 3B. It will be observed that the response time of the recorder increases with decrease in the degree of unbalance. The shape of curve 51 is dependent upon the characteristics of elements 42 and 43 and may be moved upwardly to increase the rebalancing time or downwardly to decrease the rebalancing time by adjusting contact 45 relative to resistor 44 in Fig. 1. However, if curve 51 is shifted too low the recorder will overshoot for the larger unbalances.

Referring to Fig. 4, the invention has been illustrated in connection with a system to which it is particularly applicable, namely, a system for the spectrochemical analysis of various compositions. The spectometer 55, shown diagrammatically in Fig. 4, is of the type more fully described and claimed in said copending applications, Serial Nos. 241,194 and 241,172, both previously referred to. The spectrometer 55 is provided with an entrance slit 56 through which radiation from an excited specimen as by an arc or a spark indicated by the source 57 passes to a collimating mirror 58 which directs the radiation to diffraction grating 59. From the spectrum produced by the grating 59 a line corresponding with an element of the excited specimen is selected by the positioning of an exit slit 60 with respect to the diffraction grating 59 for passage to a radiation receiver such as a phototube 61. The diffraction grating 59 preferably is disposed for rotation about a fixed vertical axis to aid in the selection of the spectral line to be directed on to the exit slit 60. A second phototube 62 is arranged to receive radiation from a reference line of the spectrum or directly from the source 57. The output of the phototube 61 is a function of the line intensity which in turn depends upon the amount of the corresponding element present in the specimen.

The phototubes 61 and 62 are preferably photomultipliers and their respective outputs are applied to the corresponding amplifiers 64, 65 and rectifiers 66, 67 respectively. The amplifiers 64 and 65 are preferably of alternating current type and the rectifiers 66 and 67 are preferably of the synchronous type, examples of which are described and claimed in U.S. Patent No. 2,638,811 to A. J. Williams, Jr. After the outputs from phototubes 61 and 62 have been amplified and rectified they are then applied to the novel ratio-measuring and recording circuit of the present invention.

The self-balancing measuring system of Fig. 4 comprises two filtering networks 70X and 70S across whose input impedances 71 and 72 are developed signal voltages resulting from the light intensities applied to photomultiplier tubes 61 and 62. The input impedances 71 and 72 have been illustrated as shunt input resistances for networks 70X and 70S respectively. The output impedance of the network 70S is preferably a slidewire resistance 74 provided with a relatively adjustable contact 75 for engagement with the slidewire intermediate its terminals 76 and 77. The output impedance of the network 70X is a tapped resistor 79 whose terminals 80 and 81 may be considered as the output terminals of the network 70X. Each of the networks 70X and 70S is provided between its input and output impedances with one or more sections comprising series resistors 82X, 82S, 84X, 84S and shunt capacitors 83X and 83S.

The whole or predetermined fixed portion of the output impedance 79 of network 70X and the continuously variable output impedance of the network 70S are included in circuit with a detector system or device generically represented by detector 85 to form a balanceable network or loop for null response of the detector 85. The voltage drop between the terminal 76 and variable contact 75 of the output impedance of network 70S is maintained equal to the voltage drop between terminals 80 and 81 of network 70X. When contact 75 is adjusted to position affording such null response, the slidewire setting corresponds with a particular ratio between the two photocell currents which in turn is definitely related to the relative intensities of the two lines of the spectrum being concurrently viewed by the cells 61 and 62.

It will be observed in Fig. 4 that the voltage across terminals 80 and 81 of resistor 79 is not derived solely from the output of cell 61 but instead, is in part dependent upon the voltage output derived from a tachometer generator 90. As schematically shown in Fig. 4, the movable contact 75 is mechanically moved with respect to slidewire 74 under the control of detector 85. The detector 85 preferably includes an amplifier and a balancing motor 86 for driving the contact 75 relative to its slidewire 74 or vice versa.

The tachometer 90 is driven from the shaft of the balancing motor 86 as indicated by mechanical connection 91 and thus is operated in accordance with adjustment of the slidewire 74 and its contact 75. The output of the tachometer 90 is applied to a voltage divider circuit including a linear impedance and a non-linear impedance with the voltage across the non-linear impedance being applied in circuit with the detector 85 to provide a damping signal for the balancing motor 86 which varies as a power less than the first power of the speed of operation of the balancing motor 86 whereby the fluctuating component of the "dark current" or the component of noise derived from the source along with the signal to be measured are substantially without effect upon adjustment of the slidewire 74. "Dark current" may be defined as the current flow through phototubes 61 and 62 during the absence of an output from the source 57.

More particularly, the output of tachometer 90 is applied to a circuit that includes a resistance 93 in shunt with a combination of resistance 94 and a non-linear impedance 95 connected in series.

The output of this circuit is obtained from resistance 97 which shunts non-linear impedance means 95. The non-linear impedance means 95 may be of the copper-copper oxide rectifier type and has been illustrated in Fig. 4 as comprising oppositely poled units connected in the circuit so that the operation of the rectifier 95 is independent of the polarity of the tachometer voltage derived from tachometer 90. In order that a selected portion of the output voltage of tachometer 90 applied to resistance 97 may be inserted in the balanceable network including detector 85, one end of resistor 97 is connected to output terminal 81 and contact 98, which is adjustable relative to resistor 97, is connected to resistance 79 intermediate its output terminals 80 and 81. By adjusting contact 98 relative to resistance 97 it is possible to select the percentage of the damping voltage derived from tachometer 90 that is to be inserted in the output of network 70X.

As the non-linear impedance or rectifier 95 has a much higher resistance at a lower tachometer output voltage than it does at a higher tachometer output voltage, the small tachometer voltages will be proportionally less attenuated by the network 94—95 than high tachometer voltages. Since the time of response of the system depends upon the damping voltage introduced in the input circuit between terminals 99 and 81, it will be seen that the time of response for small unbalances of the system will be relatively greater than the time of response for large unbalances. The foregoing is illustrated in Figs. 2B and 3B by curves 50 and 51.

To provide indicating and recording means for the above described system, the balancing motor 86 is preferably mechanically coupled by way of connection 91 to structure 100 for cooperation with a scale 101 to indicate in percent the ratio of the intensity of the spectrum line viewed by tube 61 to the intensity of the line viewed by tube 62 and selected as a reference. The structure 100 also serves as a stylus or pen for tracing on a record chart 102 the relative intensity of one or more lines of the spectrum as viewed by tube 61. Provision is preferably made for the tube 61 to scan the selected spectral line, for example, by rotating the entrance slit 56 through a small angle or by rotating the dispersing element 59. The chart 102 may be driven by a constant speed motor 103 or an equivalent timing device.

The system shown in Fig. 1 may include series resistors and shunt capacitors similarly located to resistors 82X, 84X and capacitors 83X shown in Fig. 4. These various components will provide filtering and linear damping in addition to the non-linear damping in the system and by selection of the resistance value for the resistor corresponding to resistor 84X the degree of linear damping in the system to be controlled. By increasing the resistance value of the latter resistor the linear damping effect is reduced.

With systems of the type illustrated in Fig. 4 recorder response times of less than one second have been obtained for unbalances of 99.9% of full scale. As the amplitude of the input signal decreases the response time increases in accordance with the curve 51 shown in Fig. 3B. This is in contrast to the operation of a recorder having the conventional resistance-capacitance damping wherein the recorder rebalancing time is the same for all input amplitudes. This latter operation is illustrated by curve 32 in Fig. 3.

If the present invention is applied to recorders of the speed-limited type, then the curve shown in Fig. 3B will represent the recorder operation near the balance point.

The present invention enables recorders to rebalance large unbalances in a very short time and at the same time to be substantially unaffected by small unbalances that are commonly present due to various disturbances referred to in the specification and claims as noise. In comparing recorders using conventional R-C damping with recorders embodying the present invention it was found that in scanning spectral lines with direct recording spectrochemical analysers the recorders having the conventional R-C damping and adjusted to provide reduction of noise recorded values that were low with respect to the true value by approximately 2% because of the slowed response with respect to large signals. Comparative measurements made with a recorder having the tachometer non-linear damping circuit of the present invention show that the recorder response was faster and the peak readings obtained were substantially identical with the average value of the true reading. Accordingly, by utilizing the present invention the response time of the recorder decreases as the amplitude of the measured quantity increases, thus effectively discriminating against small noise fluctuations and providing for increased precision of measurement.

It shall be understood the invention is not limited to the specific arrangements shown and that changes and modifications may be made within the scope of the appended claims.

What is claimed is:

1. A high-speed self-balancing system responsive to the magnitude of a signal in the presence of noise comprising a source of a first electrical signal including a component of noise, a source of an adjustable electrical signal in circuit with said source of first electrical signal, a signal unbalance detector connected in said circuit, means responsive to said detector for adjusting the magnitude of said adjustable electrical signal to maintain said electrical signals equal in magnitude, an electrical generator operated with adjustment of said responsive means, and a voltage-divider connected across the output of said generator having the characteristic that the ratio of input to output voltage increases with increased input voltage, the output voltage from said voltage-divider being applied in circuit with said detector to provide a damping signal for said responsive means which varies as a power less than the first power of the speed of operation of said responsive means, whereby said component of noise in said first electrical signal is substantially without effect upon said adjustable electrical signal.

2. A high-speed self-balancing system according to claim 1 wherein said voltage-divider includes a linear impedance and a non-linear impedance.

3. A high-speed self-balancing system according to claim 2 wherein said non-linear impedance has the characteristic of decreased resistance with increased voltage and in which the output voltage is taken from across said non-linear impedance.

4. A high-speed self-balancing system according to claim 3 wherein said non-linear impedance comprises a pair of oppositely poled copper-copper oxide rectifiers.

5. A high-speed self-balancing system according to claim 2 including series resistance and shunt capacitance in circuit between said source of first electrical signal and the output from said voltage divider.

6. A self-balancing measuring system for measuring the magnitude of a condition in the presence of noise comprising means for producing a standard electrical effect, means for producing an electrical effect of magnitude determined by the magnitude of the condition under measurement and including a component of noise, a network in which said effects are brought into opposition, a detector energized by unbalance of said network, an impedance in said network adjustable to rebalance it, a driving system controlled by said detector and effecting adjustment of said impedance, and means for introducing into said network an electrical effect substantially proportional to a power less than the first power of the speed of said driving system whereby said component of noise is substantially without effect on said second-named electrical effect.

7. Means for measuring the ratio of the average magnitudes of two fluctuating unidirectional currents comprising two filter networks having two input circuits through which said currents respectively individually flow, a balanceable network including a null detector in circuit with known percentages of the output impedance of said networks, a driving system responsive to said null detector, and means for applying a voltage across one of said output impedances for introducing into said balanceable network an electrical effect which varies as a power less than the first power of the speed of said driving system.

8. A system for measuring the ratio of the magnitudes of two fluctuating unidirectional currents comprising two networks each having shunt input and output impedances, means for connecting said shunt input impedances respectively, individually in circuit with the sources of said currents, a balanceable circuit including a null detector and a known fixed percentage of the output impedance of one of said networks and a known variable percentage of the output impedance of the other of said networks, driving means responsive to said null detector for adjusting the output impedance of said network of known variable percentage, an electrical generator driven with said driving means, and a voltage-divider connected across the output of said generator and having the characteristic that the ratio of input to output voltage increases with increased input voltage, the output voltage from said voltage-divider being applied in said balanceable circuit with said detector to provide a damping signal for said driving means which varies as a power less than the first power of the speed of operation of said driving means.

9. A system for measuring the ratio of the magnitudes of two fluctuating unidirectional currents according to claim 8 wherein said voltage-divider includes a linear resistance and a pair of oppositely poled copper-copper oxide rectifiers and a selected portion of the output voltage from said voltage-divider is applied to the output impedance of said one of said networks including said known fixed percentage.

10. A system for measuring the ratio of the magnitudes of two fluctuating unidirectional currents according to claim 8 wherein said voltage-divider includes a linear impedance and a non-linear impedance.

11. A system for measuring the ratio of the magnitudes of two fluctuating unidirectional currents according to claim 10 wherein said non-linear impedance has the characteristic of decreased resistance with increased voltage and in which the output voltage is taken from across said non-linear impedance.

12. A system for measuring the ratio of the magnitudes of two fluctuating unidirectional currents according to claim 10 wherein said non-linear impedance has the character of increased resistance with increased voltage and in which the output voltage is taken from across said linear impedance.

13. A high-speed self-balancing measuring system for recording the magnitude of a signal in the presence of noise but with the substantial elimination of noise from the record without reduction in the speed of response for large signals comprising a source of a first electrical signal to be measured including a component of noise, a source of an adjustable electrical signal connected in series-circuit with said source of a first electrical signal, a signal unbalance detector connected in said series-circuit, means responsive to said detector for adjusting the magnitude of said adjustable electrical signal to maintain said electrical signals equal in magnitude, an electrical generator operated with adjustment of said responsive means, recorder means operable in accordance with said responsive means, and a voltage-divider connected across the output of said generator including a linear impedance and a non-linear impedance, the voltage across said non-linear impedance being applied in circuit with said detector to provide a damping signal for said responsive means which is less than the output of said generator and the ratio of said damping signal to said output voltage increases as the condition of balance is approached.

14. A high-speed self-balancing measuring system for recording the magnitude of a signal in the presence of noise but with the substantial elimination of noise from the record without reduction in the speed of response to large signals comprising a source of a first electrical signal to be measured including a component of noise, a source of an adjustable electrical signal connected in series-circuit with said source of a first electrical signal, a signal unbalance detector connected in said series-circuit, means responsive to said detector for adjusting the magnitude of said adjustable electrical signal to maintain said electrical signals equal in magnitude, an electrical generator operated with adjustment of said responsive means, recorder means operable in accordance with said responsive means, a voltage-divider connected across the output of said generator, said voltage-divider having the characteristic that the ratio of input to output voltage increases with increased input voltage, the output voltage from said voltage-divider being applied in circuit with said detector to provide a damping signal for said responsive means which is less than the output of said generator and the ratio of said damping signal to said output voltage increases as the condition of balance is approached, and means for selecting the percentage of the output voltage from said voltage-divider to be applied in circuit with said detector for varying the speed of response of said self-balancing measuring system.

15. A high-speed self-balancing measuring system according to claim 14 wherein said voltage-divider includes a linear resistance and a non-linear resistance.

16. A high-speed self-balancing system responsive to the magnitude of a signal in the presence of noise comprising a source of a first signal including a component of noise, a source of an adjustable signal connected in circuit with said source of a first signal, a signal unbalance detector connected in said circuit, means responsive to said detector for adjusting the magnitude of said adjustable signal to maintain said signals in a predetermined relation, signal producing means operated in accordance with the speed of adjustment of said responsive means, and signal reducing means connected to the output of said producing means having the characteristic that the ratio of input to output signal increases with increased input signal, the output from said signal reducing means being applied in circuit with said detector to provide a damping signal for said responsive means which varies as a power less than the first power of the speed of operation of said responsive means, whereby said component of noise in said first signal is substantially without effect upon said adjustable signal.

(References on following page)

References Cited in the file of this patent

UNITED STATES PATENTS

| | | |
|---|---|---|
| 2,401,421 | Hahn | June 4, 1946 |
| 2,455,364 | Hays | Dec. 7, 1948 |
| 2,494,876 | Hornfeck | Jan. 17, 1950 |
| 2,522,240 | Sias | Sept. 12, 1950 |
| 2,551,833 | Ewing | May 8, 1951 |
| 2,584,954 | Williams | Feb. 5, 1952 |
| 2,593,950 | Williams | Apr. 22, 1952 |
| 2,594,436 | Hornfeck et al. | Apr. 29, 1952 |
| 2,630,736 | Beitz | Mar. 10, 1953 |
| 2,631,489 | Golay | Mar. 17, 1953 |
| 2,674,708 | Husted | Apr. 6, 1954 |
| 2,766,412 | Stephenson | Oct. 9, 1956 |